United States Patent Office 3,188,905
Patented June 15, 1965

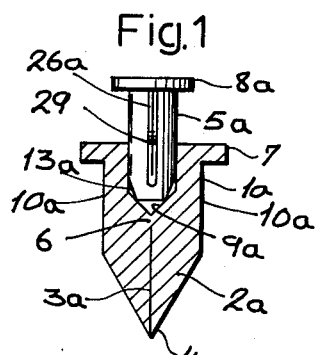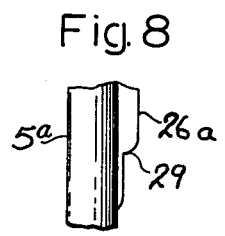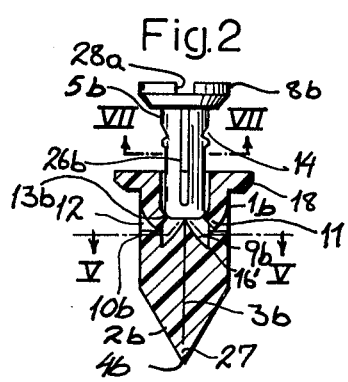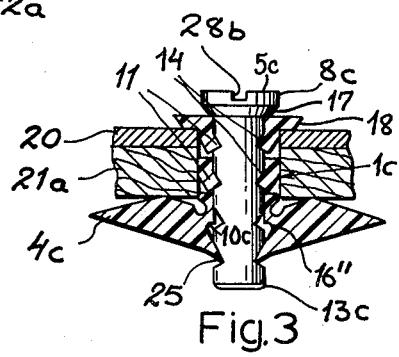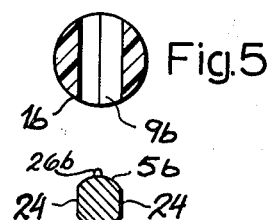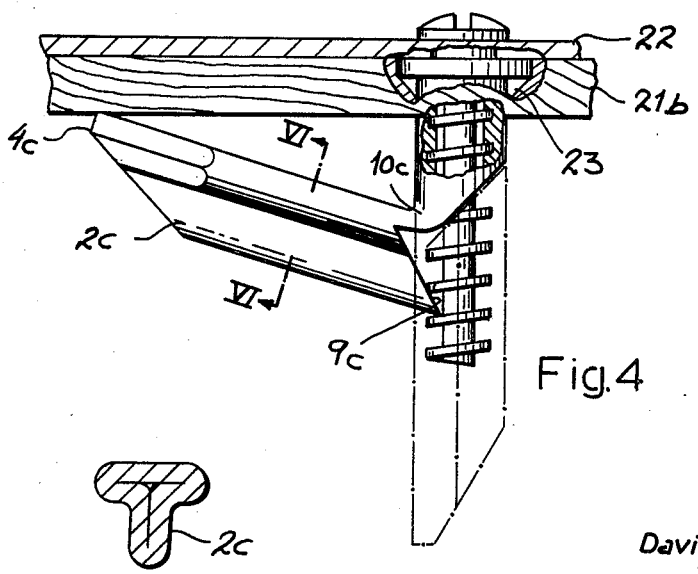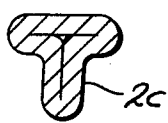

3,188,905
FASTENING DEVICE WITH PIVOTAL
LOCKING MEANS
David I. Millet, 58 Boyd St., Long Beach, N.Y.
Filed Apr. 3, 1962, Ser. No. 184,850
2 Claims. (Cl. 85—84)

This invention relates to fastening devices and, more particularly, to blind rivets, expansion anchors, self-clinching nails and removable fasteners such as through-going bolts and cotter pins.

It is the principal object of this invention to provide a simple fastener which may be driven into a support as a unit, like a common nail and which, at the completion of driving, clamps the work like a common rivet or through bolt, or, in the case of partial penetration into the support, embeds itself like an expansion anchor.

This object is accomplished by the interaction of the three main elements of the invention, to wit: a headed shank, a pusher rod or element which moves relatively to the shank and one or more lever members or which pivot relatively to the shank under the action of the pusher.

Other objects and details of the invention are described below with reference to the accompanying drawing in which:

FIGURE 1 is a sectional elevation of the fastener in which the lever arms are arranged to rotate less than ninety degrees each.

FIGURE 2 is a sectional elevation of the fastener in which the lever arms are each arranged to rotate more than ninety degrees each.

FIGURE 3 is a sectional elevation of a fastener of the same type as FIGURE 2, after driving through two panels.

FIGURE 4 is a sectional elevation of a fastener in which a single lever arm is arranged to rotate through more than ninety degrees and in which a fixture is removably fastened to a panel.

FIGURE 5 is a section of FIGURE 2, taken along the line V—V thereof, showing a preferred method of forming the pushing surfaces of the lever arms.

FIGURE 6 is a sectional elevation through the lever arm of the fastener shown in FIG. 4, taken along the line VI—VI.

FIGURE 7 is a bottom sectional view of the pusher shown in FIG. 2 taken along the line VII—VII thereof.

FIGURE 8 is an elevation view of the forward portion of ridge 26.

In the descripiton of operation which follows, the term, "forward" signifies proximity to the penetrating end of the fastener and the term, "rear" or "rearward" signifies the opposite. Similar reference numerals have been used to designate elements with similar functions.

FIGURE 1 illustrates one embodiment of the invention. It consists of a cylindrical shank 1a terminating at its forward end in two lever arms or members 2a formed by a longitudinal slit 3a in the forward portion of the shank, which lever arms terminate in a slit conical point 4a the tubular rear part of the shank 1a receiving cylindrical pusher element 5a. A ligament or web 6 restrains relative motion of the pusher 5a with respect to shank 1a until the shank head 7 is homed by hammer blows against the exposed surface of the material to be fastened. Continual driving on the head 8 of the pusher 5a causes rupture of the ligament 6 by the wedging section of the pusher 5 against the forwardly inclined surfaces 9a of the first lever portions 2a of the lever member, causing them to rotate about pivot or bending areas 10a. Ridge 26a on pusher 5a serves as a restraining element, similar in function to ligament 6. Rounded shoulder 29 restrains relative motion of pusher 5a and the shank 1a until head 7 is homed. After driving, this shoulder serves also to resiliently hold pusher 5a in the homed position and before driving its holds the pusher in the pre-assembled position in shank 1a.

The embodiment of FIGURE 2 is similar to that of FIGURE 1 except that the surfaces 9b of the lever portions 2b, cooperating with the pusher element, are rearwardly inclined from their origin in the bending or pivot area 10b of the shank 1b and one restraining device is, in this case, ligament 27 which ruptures under the action of the pusher, which causes the lever arms to spread after the head of the shank is homed. A pair of retaining elements or ridges 11 are formed by inward bending of the shank wall to the rear of transverse slits 12 in the wall of the hollow portion of the shank 1b. These lock the pusher 5 in the homed position by displacement in the manner of a ratchet and pawl, into the parallel grooves 14 on opposite sides of the cylindrical pusher.

Angled flats 13b on the forward end of pusher 5b serve the purpose of avoiding high stress and tendency to tear or shear at the re-entrant corner 16' by delaying contact of the pusher with this area until partial bending has taken place. Parallel flats 24 on pusher 5b similarly minimize this tendency by providing clearance for a substantial bending radius of each of surfaces 9b near the corner 16'.

In FIG. 3, before driving, the pusher is held in position in the shank by the resilient seating of the restraining elements (i.e. the male projections 11 axially spaced therealong) in the parallel grooves 14 on opposite sides of the pusher 5c.

In FIGURES 2 and 3, to provide for removability, the pusher 5b is cylindrical, to facilitate rotation, i.e. angular displacement of the pusher element with respect to the tubular fastener body and its shank through an angle of ninety degrees, by the use of the slots 28a in the head 8b into which a screw driver may be inserted. The locking elements 11 are forced outwardly and unseated from the parallel grooves 14 by this rotation. The head of the pusher 5b is preferably provided with a chamfer or shoulder 17 which may be used to facilitate withdrawal. A similar shoulder 18 may be provided for the same purpose on the head of the shank 1c.

The forward end of the pusher 5c is provided in FIG. 3 with a rounded edge 13c, which serves the same purpose as the angled flats 13a, 13b provided in FIGS. 1 and 2. The re-entrant corners 16" are formed in this illustration as parallel rounded grooves to minimize tendency to fracture. Similar parallel grooves are provided on the outside of the bending areas for the same purpose and also to facilitate bending.

While these illustrations show the major surfaces of shanks 1 and pushers as circular in section, it is evident that some applications of this invention may be more advantageously made with these surfaces polygonal in section.

While not shown in the drawing, it is preferable, in some applications requiring greater resistance to pull-out of the shank, that the parallel grooves 14 shown in FIGS. 2 and 3 be replaced by deep-cut helical threading, preferably doubled and square-cut, extending the entire length of the shank 5c. In this type, if the resilient fingers or ridges or pawls 11 are helically arranged, the pusher 5c may be rapidly inserted by hammer-blows on head 8 and removed by unscrewing with a screw driver. Chamfer 17 becomes superfluous under these conditions.

FIG. 4 shows how the fastener may be made in the form of a T-shaped flattening of a cylindrical shank to provide a single lever. The pusher is threadedly engaged in this illustration with the shank, the fins 23 gusseting the head to the shank prevent rotation of the latter during driving of the threaded pusher which is inserted through a hole in a removable fixture 22. In this case, the head of the shank has previously been driven home by hammer blows applied to its rear surface until that surface is substantially flush with the exposed surface of panel 21a or 21b. The forward end of the fastener is shown by dashed lines before insertion of the pusher. Its homed position is shown by solid lines. The formation 9c engages the thread of the pusher while the lower portion 2c bends at 10c so that its extremity 4c engages the back of wall 21b.

This invention includes without limitation those forms in which the rear end of the pusher is the fixture-securing means and those forms in which the shank is the fixture-securing means, as well as embodiments wherein a single lever arm is employed and those in which a multiplicity of lever arms are used.

This invention includes without limitation those forms in which the free end of the rear surface of the lever arm initially approaches the longitudinal axis of the pusher and those forms in which the initial travel of the lever arm during rotation is away from this axis.

Not all possible and useful combinations are shown in the drawings. For example, the type of fastener shown in FIG. 4 may be made with the un-threaded pusher and shank shown in FIG. 1 or FIG. 2. Likewise, the type of fastener shown in FIG. 1, 2 or 3 may be made with a threaded pusher and shank and fins to prevent rotation of the shank during insertion of the threaded pusher. Likewise, the type of fastener shown in FIG. 2, 3 or 4 may be made with lever arms whose rear surfaces 9 are forwardly instead of rearwardly inclined from their origins in the shank.

As shown in the drawings, it is clear that this invention includes for use with any structure where the drilling or forming of a hole or cavity is necessary or desirable before the installation of a fastener, plugs of fiber or plastic material for insertion in said hole or cavity. However, the great radial forces generated on expansion of the currently available fiber, plastic or lead plugs would be avoided and a stronger anchorage secured by the use of that form of this invention in which the lever arm rotates through an angle of more than ninety degrees. Furthermore, for use with thin panels or sheet metal, fiber, plastic or lead expansion plugs are not practical in the current state of the art, whereas these plugs, with or without hard metallic reinforcement become perfectly feasible for thin panels by the use of this invention because of the unique clamping action which takes place not within the aperture or hole, but behind the far panel, i.e. at the surface of the support means remote from the side at which the fastener is inserted.

Though not shown in the drawings, it is clear that the penetrating end of the fastener may be blunt for use in materials in which holes are provided or in materials of relatively low strength.

Fasteners presently available for detachably securing fixtures, etc. to panels must be installed by at least three separate operations. First, a hole must be drilled through the panel. Second, the anchor is installed. Third, the fixture securing screw is inserted through a hole in the fixture and tightened by rotation, expanding the fastener.

It would be greatly advantageous in saving of installation time, were a fastener to be made available for the above purpose which could be driven through a hole in the fixture and thence through the panel like a common nail or like a wood screw and would, in this single operation, removably anchor the fixture to the panel. It is the principal object of this invention to accomplish this.

This invention combines the characteristics of blind rivets, or, more exactly, blind eyelets, with those of self-clinching nails and expansion shields in a novel manner, resulting in a fastener which may be driven as a unit into solid materials or into materials provided with tightly fitting, loosely fitting, or poorly aligned holes.

One form of this invention provides for rotation of the lever arms through an angle greater than a right angle, thus providing a fastener which (1) strongly clamps the fastened panels between the head of the fastener and the lever arms and (2) can be provided with long lever arms to spread the load imposed on the panel over a large area of the panel.

One of the advantages of this invention is that it completely eliminates lateral movement or expansion within the panels to be joined. The only similarly driven fastener available which approaches this feature is the blind rivet.

The common blind rivet suffers from the disadvantage that it must impose radial forces at the concealed edge of the aperture to achieve clamping action between head and expanded end. Any clamping action must be accompanied by deformation of the inner rim of the aperture by the expanding end of the blind rivet. It is evident that the area of contact with the concealed side of the work, the area which resists pull-out, is severely limited by this fact. The novel use of lever arms which pivot through angles greater than ninety degrees in this invention permits great enlargement of the area of the workpiece acting to resist pull-out.

Other disadvantages of the conventional blind rivet are:

(1) It must be accurately sized to the thickness of the work. If it is too short, it cannot be expanded in strong material or its fractures brittle material.

(2) If it is too long, it does not provide any clamping action.

(3) Fit is critical.

(4) Cold flow of the rivet material and/or the workpiece requires great driving force.

The present invention overcomes these disadvantages.

Self-clinching nails suffer from one or more of the following disadvantages:

(1) They must appreciably expand within the materials being joined. Thus their use is limited to very soft materials such as soft woods, soft fiber boards, etc.

(2) The clinching elements act as slender cantilever beams.

The present invention overcomes these disadvantages. In the present invention, the lever arm acts as a cantilever beam in that form in which it rotates through more than ninety degrees, but it may be made as thick as the transverse dimension of the shank as in FIG. 4.

Other advantages of the present invention over the self-clinching nail are:

(1) The pusher is reinforced in its column strength during driving by the guiding action of the tubular shank which encloses it. It is therefore possible to make the bending area at the origin of the lever arm in the shank suitably thick, wide and strong because of this strengthening of the pusher.

(2) The stiff, securely guided and locked pusher, in its homed position, strongly supports the lever arm in its homed position.

(3) In the case of multiple lever arms, this bracing action (supporting action) is further strengthened by the opposition of the lever arms.

A principal use of this invention is as a fastener for sheet-metal fabrication, as in automobile and aircraft bodies, sheet metal or thin panel cabinets, etc. Another use is in sheet-metal duct-work erection. Sheet-metal screws are comparatively weak as their strength is limited by the thickness of the concealed sheet. In addition, the hammer-drive type of the present invention offers a simpler and quicker method of installation.

Another use of this invention is in fastening wire lath or corrugated or flat metal or cement-asbestos or similar sheet material in building construction to steel studs or framing members by clamping action. In some cases of this use, it would be advantageous to eliminate the holes in said studs or framing members, as the long lever arms provided by this invention can grip an edge effectively. Installation alongside one or both edges of the hammer-drive type would provide economical fastening.

For heavy duty use, such as railroad spikes, dock building, or other places where conventional spikes or through-bolts are now used, or where ease of installation is important, this invention could take any of the forms described, with the added feature of a single hinged or pinned joint which would replace the bending area at the origin of the lever arm in the shank.

In materials where fracture of the bending area of the lever arms, where they originate in the shank, is a problem, due to insufficient toughness or too great notch-sensitiveness, this invention preferably takes the form shown in FIG. 4. In this form, the blank material for the shank is tubing or sheet stock, and the bending area is essentially free of work-hardening operations during forming. If sheet stock is used as the blank material, this flat area would not be worked at all during forming.

It is advantageous in some applications of this fastener to omit the ridges or fingers 11 in the shank and to depend on the interlocking of the end of the lever arms 25 with the transverse grooves 14 on the pusher surface in the homed position.

An improvement, not shown in the drawing, which flows from this invention is one or more secondary arms originating in the outer surface of the shank to the rear of the bending area of the lever arms and extending forward past said bending area of the lever arms, thus overlapping the latter. As the lever arm or arms rotate about their point(s) of origin in the shank, it or they rotate the secondary arm(s) about its or their point(s) of origin in the shank by sliding pressure against the inner surface(s) of the latter until they are substantially parallel to and homed against the far side of the concealed panel. When used in connection with that form of the invention in which the lever arms rotate through an angle greater than ninety degrees, the forward end of the lever arm is, at this point, in contact with that surface of the secondary arm which was initially internally oriented, which latter, if provided with a suitable depression or other interengaging means at said point of contact, into which the forward end of the lever arm engages, is now strongly braced in its homed position by the lever arm, preferably at an angle of forty-five degrees, through other angles of bracing may be more advantageous in some applications.

Another form of this invention, not shown on the drawings, is one in which a plurality of lever arms rotate in planes parallel to each other and to a plane passing through the longitudinal axis of the pusher. The advantage of this form of the invention is that the rear surface 9 of each lever arm may be made longer than in any of the plural-armed types illustrated in the drawing, and the width of each lever arm, and thus its depth as a cantilever beam, may be doubled as it may be the full transverse dimension of the shank, instead of half thereof.

On the basis of the foregoing description, I claim:

1. A fastener for insertion within an aperture provided in a support and engageable with a remote surface thereof opposite a side of said support at which said fastener is inserted, said fastener comprising a generally tubular body having a head engageable with said side of said support, a shank and a lever member integral with said shank, and an axially displaceable pusher element shiftable relatively to said body and received therein inwardly of said shank, said pusher element having a face generally transverse to the axis of said body, said lever member having a first lever portion extending from said shank inwardly into the path of said pusher element and engageable by said face thereof, said first lever portion having an oblique surface cooperating with said face and extending linearly from said shank into contact with said face while lying in a plane inclined to said axis and outwardly therefrom in the direction of displacement of said pusher element, said lever member being swingable with respect to said shank upon engagement of said pusher element with said first lever portion through an angle upwardly of about 90° and having a second lever portion remote from said first lever portion adapted to be forced against said remote surface by said pusher element, said pusher element being provided with at least one peripheral recess interrupting the periphery of said element, and said shank being provided with at least one retaining element extending into the bore of said shank, the uninterrupted portion of the periphery of said pusher element being of greater circumferential extent than the circumferential extent of said retaining element, whereby the free end of said retaining element is engageable in said recess in one relative angular position of said body and said element and disengageable in another relative angular position for releasably securing said pusher element against axial displacement within said body.

2. A fastener as defined in claim 1 wherein said retaining element constitutes one of at least one row of axially spaced similar retaining elements forming on said shank and extending inwardly into the path of said pusher element, said recess being located on said element for successive engagement with said retaining elements.

References Cited by the Examiner
UNITED STATES PATENTS

| | | | |
|---|---|---|---|
| 964,226 | 7/10 | Farrand | 85—31 |
| 1,056,452 | 3/13 | Remhilt | 85—4 |
| 1,095,366 | 5/14 | Abbott | 85—2.4 |
| 2,058,338 | 10/36 | Meissner | 85—40 |
| 2,091,882 | 8/37 | Robinson | 85—2.4 |
| 2,555,420 | 6/51 | Richardson | 85—40 |
| 2,843,861 | 7/58 | Gandy | 85—40 |
| 2,877,682 | 3/59 | Barry et al. | 85—40 |

EDWARD C. ALLEN, *Primary Examiner.*